United States Patent
Matula et al.

(10) Patent No.: US 10,621,539 B2
(45) Date of Patent: *Apr. 14, 2020

(54) CONTACT CENTER DELIVERY IN-BUILDING HOMING SERVICE

(71) Applicant: Avaya Inc., Santa Clara, CO (US)

(72) Inventors: Valentine C. Matula, Granville, CO (US); David Skiba, Golden, CO (US); George Erhart, Loveland, CO (US)

(73) Assignee: Avaya Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/029,868

(22) Filed: Jul. 9, 2018

(65) Prior Publication Data

US 2018/0315006 A1     Nov. 1, 2018

Related U.S. Application Data

(60) Continuation of application No. 15/233,465, filed on Aug. 10, 2016, now Pat. No. 10,210,472, which is a
(Continued)

(51) Int. Cl.
*G06Q 10/08* (2012.01)
*H04W 4/024* (2018.01)
(Continued)

(52) U.S. Cl.
CPC ......... *G06Q 10/083* (2013.01); *B64C 39/024* (2013.01); *G01C 21/00* (2013.01);
(Continued)

(58) Field of Classification Search
CPC . G06Q 10/083; G06Q 30/0635; H04W 4/024; H04W 4/33; H04W 4/30;
(Continued)

(56) References Cited

U.S. PATENT DOCUMENTS 7,921,218 B2    4/2011 Cheng et al.
8,405,484 B2    3/2013 Erhart et al.
(Continued)

FOREIGN PATENT DOCUMENTS

KR    10-2011-0033556    3/2011

OTHER PUBLICATIONS

Restriction Requirement for U.S. Appl. No. 14/512,666, dated Nov. 13, 2015, 4 pages.
(Continued)

*Primary Examiner* — Marthe Y Marc-Coleman
(74) *Attorney, Agent, or Firm* — Sheridan Ross P.C.

(57) ABSTRACT

The delivery of goods to a customer comprises a substantial portion of human activity. To correct address errors and/or to more precisely locate delivery locations, systems are provided to assist human, human operated vehicle, or autonomous vehicles to locate a delivery point. Often the location of a delivery point is inaccurate or imprecise. GPS and other coordinate systems often fail or are imprecise without an unobstructed view of the sky. Even with coordinates available, the delivery point may be different from the coordinates or, more commonly, coordinates that are different from some standard point within a postal address associated with the coordinates. Providing a delivery system that utilizes a broadcasted identifier, such as an identifier associated with the order of the item, the delivery of the item may be made proximate to the source of the broadcasted identifier or further refined using the broadcasted identifier as a reference.

20 Claims, 6 Drawing Sheets

Related U.S. Application Data division of application No. 14/512,666, filed on Oct. 13, 2014, now Pat. No. 9,418,350.

(51) Int. Cl.
*H04W 4/33* (2018.01)
*H04W 4/30* (2018.01)
*H04L 29/12* (2006.01)
*H04L 12/24* (2006.01)
*H04H 20/53* (2008.01)
*G06Q 30/06* (2012.01)
*B64C 39/02* (2006.01)
*G01C 21/00* (2006.01)

(52) U.S. Cl.
CPC ......... *G06Q 30/0635* (2013.01); *H04H 20/53* (2013.01); *H04L 41/22* (2013.01); *H04L 61/6022* (2013.01); *H04L 61/6081* (2013.01); *H04W 4/024* (2018.02); *H04W 4/30* (2018.02); *H04W 4/33* (2018.02); *B64C 2201/128* (2013.01); *B64C 2201/141* (2013.01)

(58) Field of Classification Search
CPC . H04L 61/6081; H04L 41/22; H04L 61/6022; B64C 39/024; B64C 2201/128; B64C 2201/141; H04H 20/53; G01C 21/00
USPC .......................................................... 701/23
See application file for complete search history.

(56) References Cited

U.S. PATENT DOCUMENTS

| | | | |
|---|---|---|---|
| 8,416,944 B2 | 4/2013 | Erhart et al. | |
| 8,634,543 B2 | 1/2014 | Flockhart et al. | |
| 8,964,958 B2 | 2/2015 | Steiner | |
| 8,989,053 B1 | 3/2015 | Skaaksrud et al. | |
| 9,418,350 B2 | 8/2016 | Matula et al. | |
| 2004/0174264 A1 | 9/2004 | Reisman et al. | |
| 2008/0313037 A1 | 12/2008 | Root et al. | |
| 2010/0061294 A1 | 3/2010 | Proctor, Jr. et al. | |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2011/0256881 A1 | 10/2011 | Huang et al. | |
| 2012/0159533 A1 | 6/2012 | Reddy et al. | |
| 2013/0173402 A1 | 7/2013 | Young et al. | |
| 2013/0301630 A1 | 11/2013 | Suda et al. | |
| 2014/0094193 A1 | 4/2014 | Huang et al. | |
| 2014/0136414 A1 | 5/2014 | Abhyanker | |
| 2014/0164126 A1 | 6/2014 | Nicholas et al. | |
| 2015/0058129 A1 | 2/2015 | Nevid et al. | |
| 2015/0088731 A1 | 3/2015 | Ackerman | |
| 2015/0185034 A1 | 7/2015 | Abhyanker | |
| 2015/0241548 A1 | 8/2015 | Jones et al. | |
| 2015/0332206 A1 | 11/2015 | Trew et al. | |
| 2015/0336669 A1 | 11/2015 | Kantor et al. | |
| 2015/0339933 A1 | 11/2015 | Batla | |
| 2016/0048796 A1* | 2/2016 | Todasco ............... | G06Q 10/083 705/330 |
| 2016/0350702 A1 | 12/2016 | Matula et al. | |

OTHER PUBLICATIONS

Official Action for U.S. Appl. No. 14/512,666, dated Dec. 8, 2015, 9 pages.
Notice of Allowance for U.S. Appl. No. 14/512,666, dated Apr. 5, 2016, 9 pages.
Official Action for U.S. Appl. No. 15/233,465, dated Oct. 11, 2017 9 pages.
Notice of Allowance for U.S. Appl. No. 15/233,465, dated Apr. 16, 2018 9 pages.
Notice of Allowance for U.S. Appl. No. 15/233,465, dated Sep. 25, 2018 6 pages.

* cited by examiner

CONTACT CENTER DELIVERY IN-BUILDING HOMING SERVICE

CROSS REFERENCE TO RELATED APPLICATION

The present application is a continuation of U.S. patent application Ser. No. 15/233,465, filed Aug. 10, 2016 which is a divisional of U.S. patent application Ser. No. 14/512,666, filed Oct. 13, 2014, entitled "CONTACT CENTER DELIVERY IN-BUILDING HOMING SERVICE", now U.S. Pat. No. 9,418,350, each of which is herein incorporated by reference in their entirety and for all that they teach.

FIELD OF THE DISCLOSURE

The present disclosure is generally directed toward location services and more particularly toward contact center utilization of such services.

BACKGROUND

The delivery of physical packages has many challenges, including non-specific addressing, poorly marked multi-unit buildings, difficult to read address markers, lack of delivery/drop-off area, security, theft, etc. Many times the physical issues of finding a delivery location are compounded by human error and/or fraud. To combat these issues, chips and locators have been placed in boxes or in the items to be delivered or the carrier (e.g., drivers, container, etc.). Couriers often call ahead of the delivery to verify the delivery location. However, current remedies are costly, resource intensive, and are still prone to delivery error. Once a package is delivered, it can also be difficult to track. Weather and access issues can further compound the difficulty in getting a delivery to its intended destination.

Rather than rely on humans to deliver packages, e-retailers are beginning to utilize aerial delivery drones for delivery of small packages. Drone delivery is designed to get a package to a customer quickly and cheaply. One significant disadvantage of the drone delivery system is the drone's inability to make decisions, which can be especially problematic when it is discovered that a delivery address is less than straightforward.

When making a purchase or defining a delivery, geo-location can be provided to be used during the delivery process. However, the delivery person, drone, or robot will have difficulty when either: a) they are unable to receive a geo-location, such as due to a loss of signal upon entering a building or b) geo-location is not specific enough, such as when a delivery point fails to consider multi-floor buildings having multiple units stacked vertically on top of each other, all with the same geo-location.

SUMMARY

It is with respect to the above issues and other problems that the embodiments presented herein were contemplated. The disclosure herein provides, amongst other things, location data based on a signal associated with the delivery point.

While global positioning system(s)/satellites (GPS) and other location-determining systems (e.g., LORAN, cellular triangulation, etc.) may identify a point on Earth, in the domain of package delivery, issues still remain. For example, delivering packages via aerial drone to the exact coordinates of the customer may cause the package to be delivered to a roof, or even the roof of a multistory building. Even if vertical coordinates are known, the item may not be deliverable to those coordinates, such as inside a residence or other inaccessible area.

As one benefit of the disclosures provided herein, a location assistance service using a media access control (MAC) address to provide a physical location to a delivery device or person to improve order completion.

A MAC address, service set identifier (SSID), or other site-identifier (identifier) may be collected by an order center (e.g., a contact center). The collection of the identifier may be performed during order-taking (e.g., the customer uses their delivery destination network to place an order with a contact center). Alternatively, the customer may provide the identifier information while on a different network (e.g., when using a work or coffee shop network the user's previously collected home network identifier is provided during the ordering process for delivery to the home address). Then, for example, when a delivery drone gets within close proximity of the delivery address, the drone is operable to "home in on" the user's specific apartment by seeking and locating the source of the identifier and the access point associated with the order.

A drone may be used to deliver a product to apartment, hotel room, etc. where an address may be incomplete or ambiguous. A MAC address of interaction from an ordering application can be provided to the drone. The drone is operable to travel to the general area of the incomplete address. The drone can home in on a specific apartment by seeking and locating the physical device that is paired with the MAC address of an access point that was used when the product was ordered. When there is vertical ambiguity, these techniques may be the only tools available to detect and home in on a residence on the correct floor of the apartment building or office skyscraper.

In a non-limiting example, Annika orders a tablet computer from a retailer. A local distributer has the tablet in stock and a drone is dispatched the same day to perform the delivery. Unfortunately, Annika lives in a brand new apartment building that has all of the apartments on one floor in a square, making GPS and other coordinate-only location strategies incomplete or non-existent. The drone signals back to the contact center, querying for the physical location of the ordering device based on MAC address of Annika's laptop. The contact center sends back the MAC address and the physical location of Annika's laptop is determined by the drone. The drone flies to the correct door and delivers the tablet. The contact center sends delivery notification, and Annika collects the tablet from the front porch on the same day she ordered it. A drone (e.g., an aerial drone) is one delivery vehicle. Other delivery vehicles include, without limitation, non-flying drones or robots (e.g., hospital delivery robot, office mail-delivering robot, etc.), self driving and human operated cars, vans, and trucks, a human with a device (e.g., integrated or discrete signature pad, communication device, navigation device, etc.).

In another embodiment, an application may be used that detects and/or interacts with the access point that uses a signature data sequence as the identifier. The drone is operable to home in on the communication device by seeking out the specific data sequence from the application, even if the data sequence is encrypted (e.g., an application homing data sequence).

In another embodiment, the drone may be operable to seek the identifier (e.g., MAC address) of the communication device that was used to order the item by having the delivery vehicle pretend to be an access point in an attempt to pull a packet from the communication device and cause the identifier to be broadcasted.

The matching of a MAC address or other identifier to a physical location is not required to be performed prior to the vehicle's search. Rather, the vehicle may be sent to a region for delivery and/or discovers an inexact address. Once at the region, the vehicle fine tunes the delivery location by searching for the identifier in the signals being broadcasted in the region.

In still another embodiment, upon discovery of the identifier, a remote control mode may be enabled for final-leg delivery (e.g., get the drone to the actual apartment door instead of in the bushes). The remote control mode may allow an agent of the contact center, automated system, recipient, or other party to take full or partial control of the delivery drone. Automated systems may utilize one or more secondary sensed information (e.g., optical character recognition of a number on a door or name of a business, an image of an object to avoid, an image of an acceptable space to deliver the payload, a directional microphone detecting, "over here" or "go away," an image of a person waving, pointing, etc., or other sensed datum).

In one embodiment, delivery device is disclosed, comprising: a first communication interface operable to receive at least a first location for an item for delivery and a broadcast identifier associated with a customer communication device placing the order; a navigation component operable to direct the delivery device, with the item for delivery, to the first location and deliver the item therein; a broadcasted identifier detection module operable to receive a broadcasted signal and determine if the broadcast signal comprises the broadcasted identifier and a source of the broadcast identifier; and upon determining the broadcasted identifier has been received, the navigation component is further operable to refine the first delivery location to be a second delivery location in accord with the source of the broadcasted identifier.

In another embodiment, a customer communication device is disclosed, comprising: a network interface operable to facilitate a communication between the customer communication device and a contact center over a network; a transmitter operable to broadcast a network identifier associated with the communication between the customer communication device and the contact center; a user interface, operable to place an order for an item for delivery from a user and cause the network interface to broadcast the order to the contact center, wherein the order comprises a first delivery location and the network identifier; and wherein the transmitter is further operable to broadcast the network identifier for reception by a delivery vehicle operable to deliver the item to the first delivery location and in accord with the location of the transmitter.

In another embodiment, a contact center is disclosed, comprising: a network interface operable to facilitate electronic communication between the contact center and a customer communication device utilized for placing an order on behalf of a customer for an item for delivery; an order processing component operable to receives the order from the customer communication device comprising an item for delivery, a first delivery location, and a broadcasted identifier associated with the customer communication device; and a delivery device dispatch module operable to provide a delivery device with the first location and the broadcast identifier and wherein the delivery device is operable to approach the first delivery location and refine the first delivery location to be a second delivery location in accord with the delivery device determining the source of the broadcasted identifier.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The identification in the description of element numbers without a subelement identifier, when a subelement identifiers exist in the figures, when used in the plural, is intended to reference any two or more elements with a like element number. A similar usage in the singular, is intended to reference any one of the elements with the like element number. Any explicit usage to the contrary or further qualification shall take precedence.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
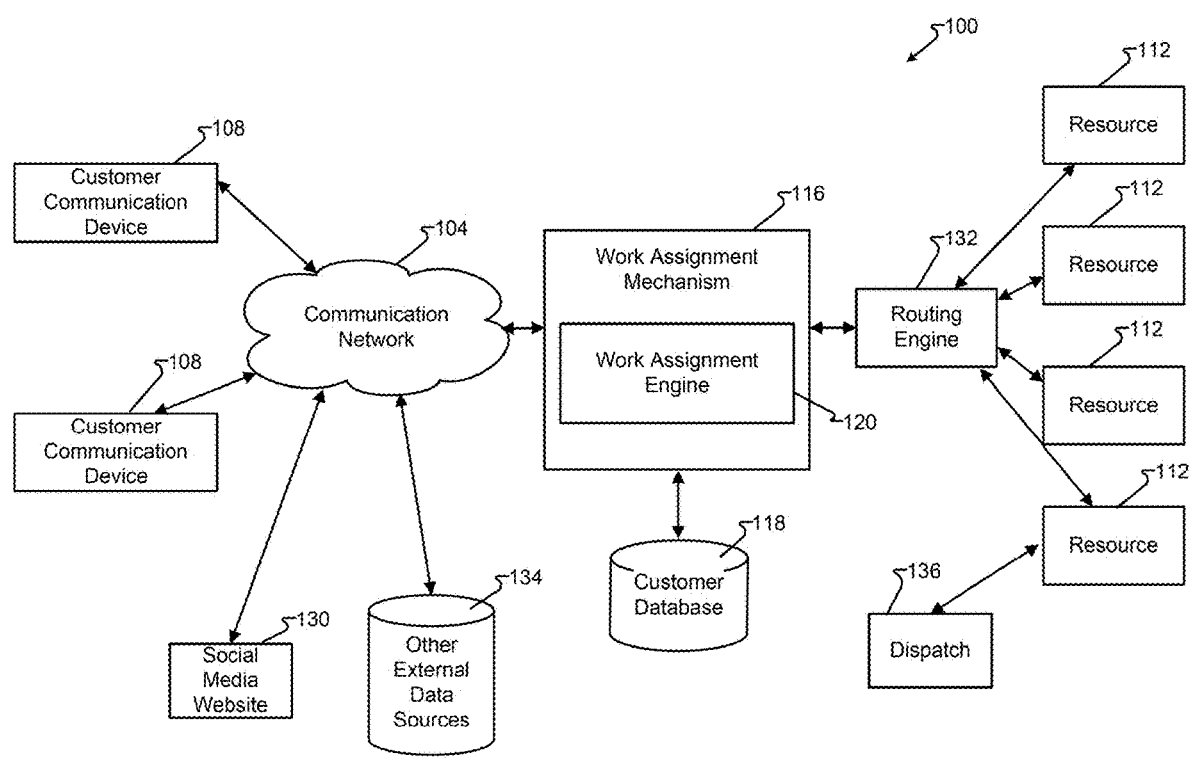
FIG. 1 depicts a communication system in accordance with embodiments of the present disclosure.

FIG. 1 shows an illustrative communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from customer communication devices 108. Additionally, social media website 130 and/or other external data sources 134 may be utilized to provide one means for a resource 112 to receive and/or retrieve contacts and connect to a customer of a contact center. Other external data sources 134 may include data sources such as service bureaus, third-party data providers (e.g., credit agencies, public and/or private records, etc.). Customers may utilize their respective customer communication device 108 to send/receive communications to the contact center utilizing social media website 130.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for broadcasting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Illustrative work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages broadcasted over the communication network 104. For example, the work item may be broadcasted as a telephone call, a packet or collection of packets (e.g., IP packets broadcasted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 132 to connect the communication device 108 which initiated the communication with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to the contact center. Customer database 118 may be updated in response to a work item and/or input from resource 112 processing the work item.

In one embodiment, a message is generated by customer communication device 108 and received, via communication network 104, at work assignment mechanism 116. The message received by a contact center, such as at the work assignment mechanism 116, is generally, and herein, referred to as a "contact." Routing engine 132 routes the contact to at least one of resources 112 for processing.

In another embodiment, one or more of resources 112 may interact with, control, and/or integrate dispatch 136. Dispatch 136 may comprise a number of functions to facilitate delivery of an item. More particularly, dispatch 136 may comprise any one or more of, route planning, weather monitoring/prediction, traffic monitoring/prediction, emergency service monitoring, delivery vehicle selection, delivery vehicle monitoring, delivery vehicle servicing and maintenance, delivery vehicle failure management, etc. For example, resource 112 may receive an order for liquor, pharmaceuticals, or a high-value item and dispatch a vehicle, which is also associated with a human driver. The driver makes the delivery upon receiving proper evidence of the age and/or identity of the recipient. Dispatch 136 may dispatch one type of vehicle (e.g., an aerial drone) if the weather accommodates such a delivery mode and, if not, another type of vehicle (e.g., self-driving car, human driver and van, etc.) is selected. Dispatch may select a vehicle based upon another attribute of the item being delivered. For example, the size, weight, fragility, or other aspect may require or prevent delivery by a particular vehicle or type of vehicle. Additionally, the customer associated with customer communication device 108 may specify what vehicle, or vehicle type, should or should not be used (e.g., the park next door is having a kite flying competition, use ground-based vehicles only; due to construction activity vehicles longer than 40 feet will not be able to access the dock this week, no tractor-trailers; deliver to building 3, west door; etc.).

Dispatch 136 may track vehicles and/or items therein and report to resource 112 or other component, such as to provide a more accurate indication of when the vehicle will make the delivery or when the vehicle may be re-tasks to make another delivery or perform another action (e.g., recharge, refuel, change drivers, etc.).

Figure 2:
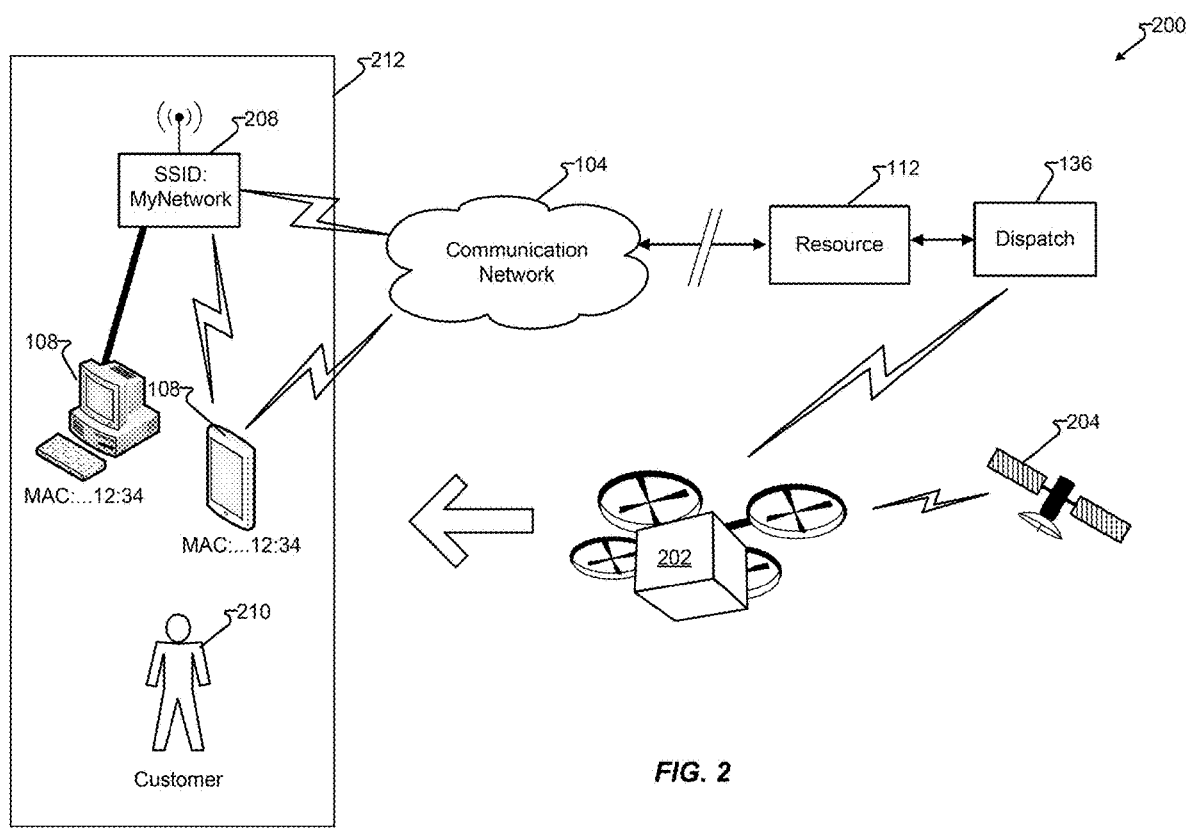
FIG. 2 depicts a delivery system in accordance with embodiments of the present disclosure.

FIG. 2 shows illustrative delivery system 200 in accordance with at least some embodiments of the present disclosure. Customer communication device 108 communicates with contact center resource 112. Certain components utilized in the facilitation of the communication between customer communication device 108 and resource 112 are omitted for the avoidance of unnecessarily complicating the figure. A more complete discussion of the communication components, including those omitted from FIG. 2, are provided with respect to FIG. 1 and the discussion thereof.

In one embodiment, at least one electronic communication device (e.g., customer communication device 108, associated customer communication device 208, etc.) is within signal area 212, and may be utilized in a communication with another device. The at least one device is known to broadcast, or may be caused to broadcast, an identifier which may, within an acceptably probability, allow signal area 212 to be identified. Signal area 212 is generally associated with the broadcast range of customer communication device 108 and/or associated customer communication device 208. When the communication is an order for an item, delivery vehicle 202 may utilize the identifier to determine its presence within signal area 212 and facilitate delivery of the item to customer 210.

Customer communication device 108 may interface directly with communication network 104 directly or via an associated customer communication device 208 (e.g., router, hub, switch, extender, etc.). Customer communication device 108 may be wired and/or wireless. Customer communication device, if operated in a wired mode may utilize a wireless mode of associated communication device 208 or other device.

In another embodiment, associated communication device 208 is a wireless network that broadcasts an SSID (e.g., "MyNetwork"). Customer communication device is a wired/wireless device with a MAC address (abbreviated to, "12:34" for convenience). While the transmission of communication signals between communication network 104 and user device 108 commonly comprises radio-frequency signals, it should be understood by those of ordinary skill in the art that communication signals utilizing other portions of the electromagnetic spectrum may be utilized without departing from the disclosure provided herein.

In another embodiment, customer 210 places an order for an item utilizing customer communication device 108. An application or other service captures an identifier (e.g., MAC address and/or SSID) or other signal that may later be used to identify signal area 212. As a benefit, an identifier that is broadcast wirelessly may be utilized even if the component associated with the identifier is utilized in wired-mode for the communication with resource 112 and the placing of the order.

Resource 112 processes the order and signals dispatch 136 accordingly. Dispatch 136 may signal vehicle 202, a human operator associated with vehicle 202, and/or other system to load the item or otherwise place vehicle 202 into condition to make the delivery.

Vehicle 202 is variously embodied to include devices that are autonomous (e.g., self driving cars and trucks, aerial and terrestrial drones, etc.). Vehicle 202 may be a single unit (e.g., areal drone) or comprise discrete components, such as a navigation device, communication device (e.g., a signature pad, smart phone, tablet, notebook, etc.), and carrier (e.g., bin, container, human, etc.). Vehicle 204 may, in part, utilize known means such as a GPS signal from satellite 204.

GPS and other navigation systems continue to improve but have several limitations within the domain of package delivery, limitations that may be reduced or eliminated with the benefit of certain embodiments disclosed herein. To provide accurate information, GPS generally requires a receiver with an unobstructed view of the sky. Once a GPS receiver is inside a building, underground, or under other structures, GPS may become less accurate as the signals may be reflected or entirely absent. Another disadvantage of GPS is that customer 210 is unlikely to give their address in terms of coordinates (e.g., latitude and longitude) but instead provides a postal address (e.g., "123 Main Street, Apt. 301"). In order to make a delivery to a coordinate, a translation from the provided postal address is made. This presents several issues. First, an address is associated with a property and a property forms a geometry that may provide for a plethora of delivery locations. For large or irregularly shaped properties, this may cause the delivery point (e.g., a house or other structure) to be some distance from the coordinates associated with the address.

Furthermore, an address may be a new construction and not yet associated with coordinates available to GPS mapping services (e.g., GIS). The position of customer 210, relative to an address, may not be particularly relevant. For example, user device 108 may be utilized to place an order for delivery in a large area (e.g., park, field, campground, stadium, etc.). Resource 112 may utilize a map and/or information from customer 210 and provide an approximate coordinate of customer 210. Providing vehicle 202 with an identifier associated with customer communication device 108 may then allow vehicle 202 to determine or confirm the location of customer 210.

As may occur from time to time, an address provided may be erroneous or incomplete. As a benefit of certain disclosures provided herein, the effects of the errors or incomplete information may be mitigated or even eliminated. While it may not be possible to identify the location of signal area 212 and/or customer 210 if an address has a significant error (e.g., Portland Me. should have been Portland Oreg.) an erroneous address that is along the route or search pattern of vehicle 202 may still be found (e.g., 123 Elm Court is behind the intended 123 Elm Circle, the misread apartment "28" does not exist but "2B" does). Incomplete addresses may omit a portion, such as a floor, suite or apartment number. By detecting an identifier associated with signal area 212, the delivery to customer 210 may still be successful.

In one embodiment, vehicle 202, having sensors therein or associated therewith, may find, or refine, a delivery point by detecting signals associated with signal area 212 and identified in the ordering process. Vehicle 202 finds a partial address and upon identification of signals associated with customer area 112, makes the delivery.

The signal comprising the identifier may not be continuously transmitted (e.g., idle, sleep mode, etc.) or the signal and/or identifier may be altered, encrypted, or otherwise not provided or not made available by vehicle 202. Vehicle 202 may transmit in a manner designed to solicit the at least one device to transmit the identifier. In another embodiment, vehicle 202 may "ping" the at least one device in a manner that causes the at least one device to reveal itself as a device within signal area 212. In another embodiment, vehicle 202 may fail to find the signal with the identifier and "call home" to dispatch 136. Dispatch 136 causes a message of a predetermined size, duration, and/or pattern to be sent to customer device 108, and associate customer communication device 208, if any. The reception of the message, and broadcast within signal area 212, provides an identification of signal area 212. For example, dispatch 136, utilizing communications network 104, may send a message to customer communication device 108. The message may be first series of short packets, followed by a predetermined pause, and a second series of packets. Vehicle 202 detecting a broadcast signal having the same pattern may then conclude it is within signal area 212.

Figure 3:
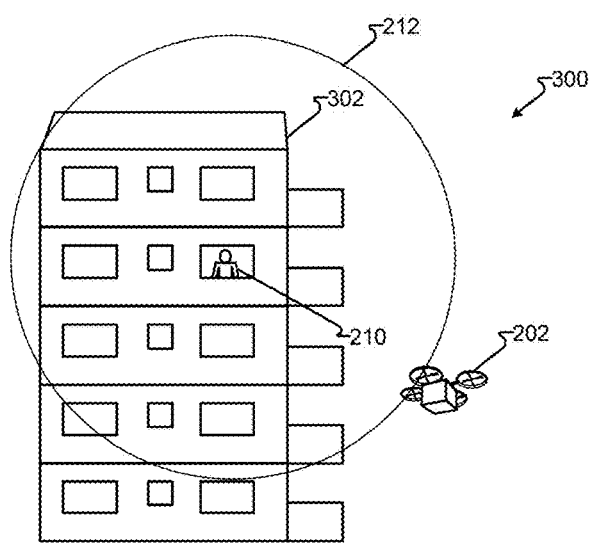
FIG. 3 depicts a first delivery location in accordance with embodiments of the present disclosure.

FIG. 3 shows illustrative delivery location 300 in accordance with at least some embodiments of the present disclosure. In one embodiment, delivery vehicle 202 was provided with a first delivery location (e.g., a postal address). However, the first delivery address omitted the floor identification. Delivery vehicle 202 approaches signal area 212 and receives a weak signal. As vehicle 202 moves vertically upward the signal strengthens and vehicle 202 until vehicle 202 reaches the strongest signal location, or at least the strongest signal location accessible by vehicle 202.

As signal area 212 indicates the presence of customer 210, the intended recipient, vehicle 202 makes the delivery.

Figure 4:
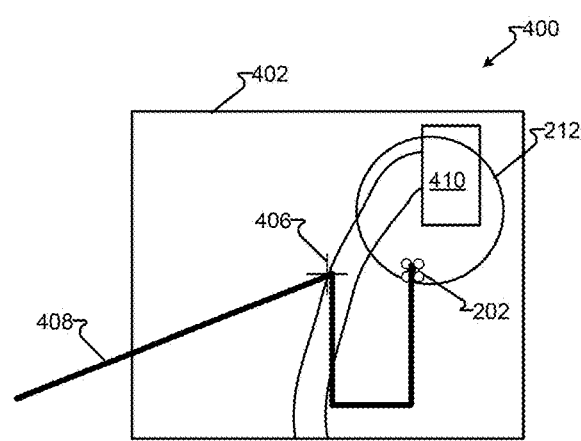
FIG. 4 depicts a second delivery location in accordance with embodiments of the present disclosure.

FIG. 4 shows illustrative delivery location 400 in accordance with at least some embodiments of the present disclosure. In one embodiment, delivery vehicle 202 was provided coordinate 406, the centroid of the first delivery address. Delivery vehicle 202 is operable to travel off road (e.g., an aerial drone) and flew path 408 to coordinate 406. Upon not detecting any signal associated with signal area 212, path 408 continued as vehicle 202 began a search pattern. Additional details of the search pattern are described more fully in connection to FIG. 6. Upon discovering signal area 212, close to house 410, delivery location is confirmed and delivery initiated.

Figure 5:
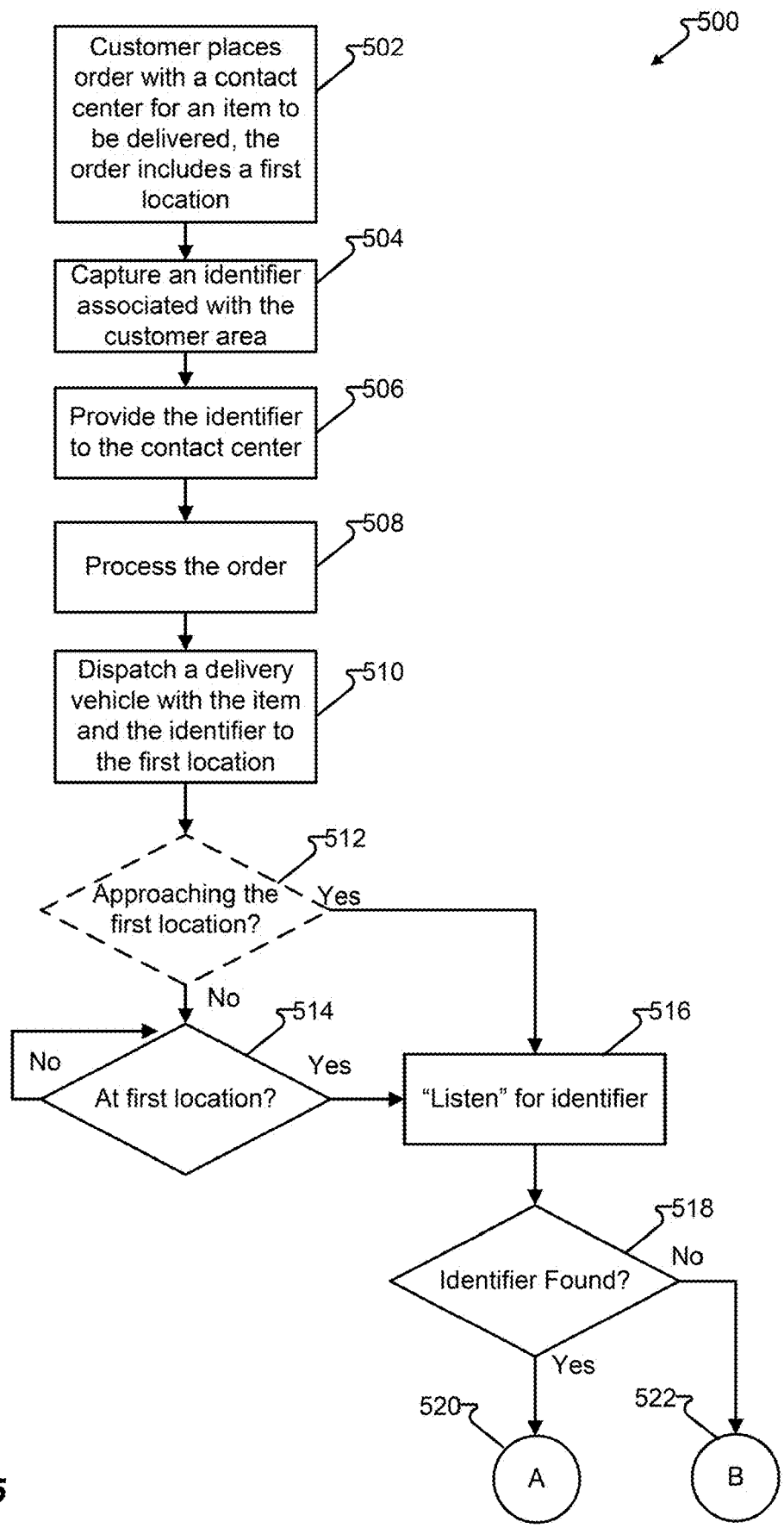
FIG. 5 depicts a process in accordance with embodiments of the present disclosure.
Figure 6:
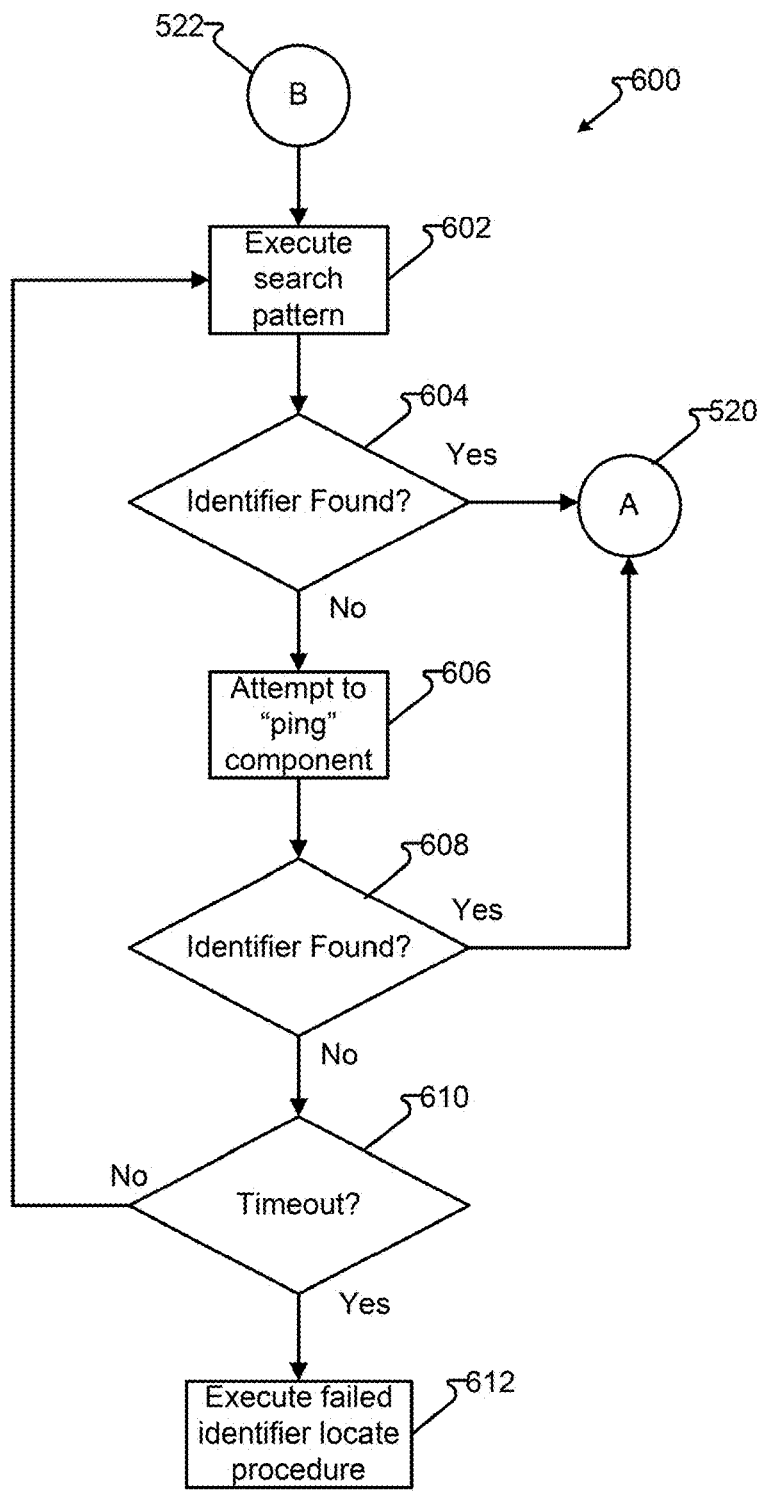
FIG. 6 depicts a process continuing from FIG. 5 in accordance with embodiments of the present disclosure.
Figure 7:
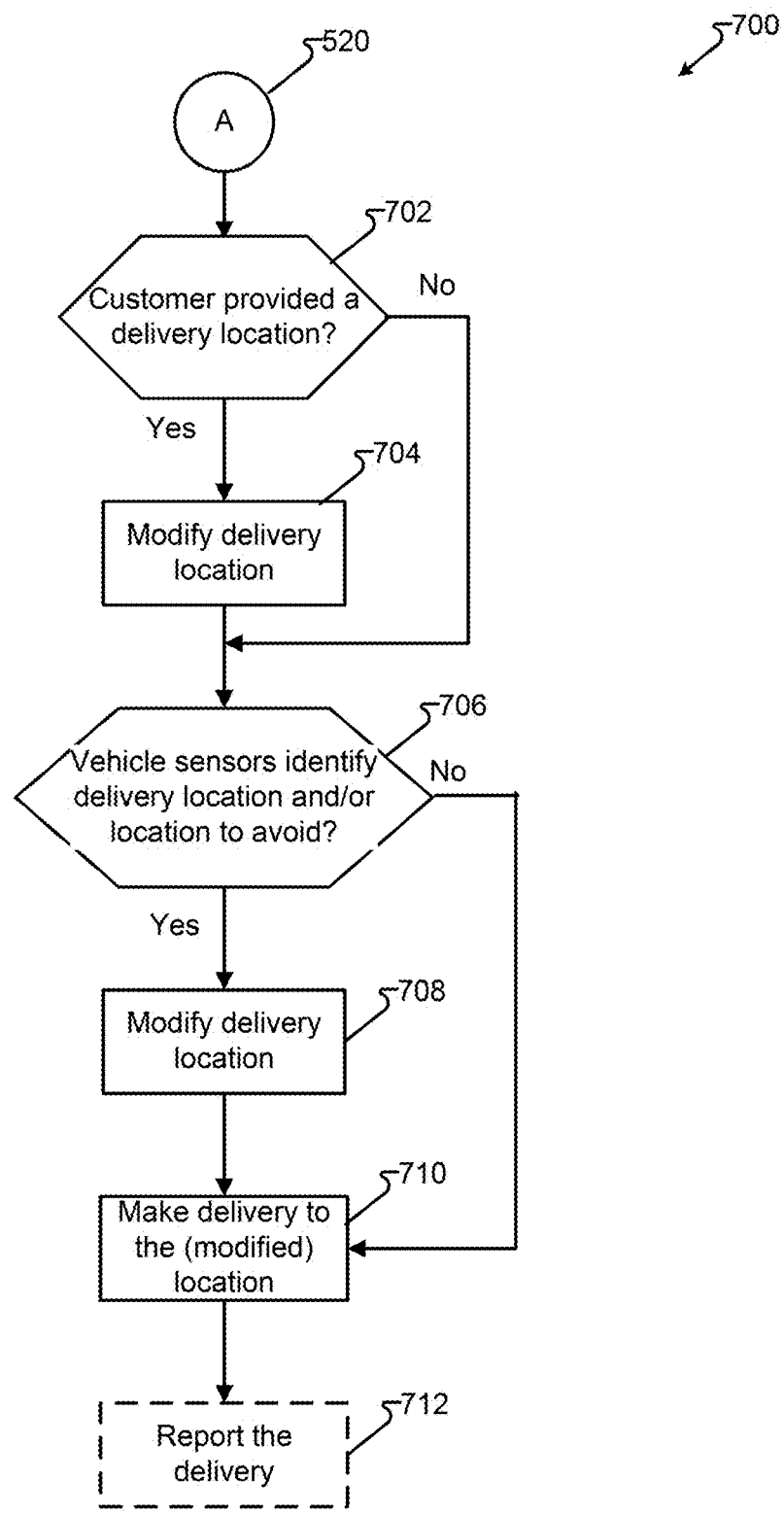
FIG. 7 depicts a process continuing from FIG. 5 and FIG. 6 in accordance with embodiments of the present disclosure.

FIGS. 5-7 depict first portion 500, second portion 600, and third portion 700 of a process in accordance with embodiments of the present disclosure. In one embodiment, step 502 is the placing of an order by customer 210 for an item for delivery. Customer 210 may utilize customer communication device 108 and optionally with associated customer communication device 208 to communicate with resource 112 over communication network 104. Step 504 captures an identifier associated with customer area 212. Step 504 may incorporate a purpose built application for execution on customer communication device 108 and further having the functionality of capturing the identifier and, as in step 506, providing the identifier to resource 112. Step 508 processes the resource. This may incorporate well known aspects of order fulfillment, such as determining if the item to be purchased is available, confirming the identity of customer 210, receiving a first location (e.g., postal address), processing payment, etc. Step 508, if unable to be completed, may terminate process 500, otherwise processing continues to step 510.

Step 510 dispatches delivery vehicle 202 with the item purchased. Step 510 may optionally perform route planning, vehicle selection, etc. Step 510 provides delivery information to vehicle 202 at dispatch and/or en route to the first location. Optional step 512 may determine that vehicle 202 is approaching the first location. Step 512 may consider a distance to the first location or a distance from a dispatch site. As a further option step 512 may always conclude the answer is "yes" and, as provided in step 516, always listen for the identifier. It should be noted that listening for the identifier when not reasonably proximate to the first location may be performed as an error check (e.g., the first location is incorrect). The identifier may be suitably unique (e.g., MAC address), and therefore listening for the identifier in step 516 may be initiated at any point in the delivery route, including at the initiation of the delivery process. If the identifier is possibly not unique (e.g., SSID="Home") step 512 may conclude that it is not approaching the first location until vehicle 202 is within close proximity of customer area 212. For example, close proximity may be an envelope around the first location that would, under optimum circumstances, be expected to present a detectable identifier. The specific distance may be further expanded, contracted, or otherwise modified as a matter of design choice. If step 512 is determined in the negative, processing may continue to step 512 or loop back to step 512 (not shown). In another embodiment, if step 512 is not incorporated or step 512 is determined to be the negative, processing continues to step 514.

Step 514 determines if vehicle 202 at the first location 514. If step 514 is answered negatively, vehicle 202 may continue to the first location and step 514 re-executed. When answered in the positive, processing continues to step 516 and, unless already initiated, step 516 causes vehicle 202 to "listen" for the identifier (e.g., attempt to receive a signal that is, or comprises, the identifier). Step 518 determines if the identifier is found. If yes, processing continues as indicated by off-page connector 520 and to FIG. 7. If no, processing continues as indicated by off-page connector 522 and FIG. to FIG. 6.

FIG. 6 depicts second process portion 600 and continues from off-page connector 522 in accordance with embodiments of the present disclosure and is generally associated with at least one failure to locate the identifier. Process portion 600 illustrates one process operable to search for the identifier. Step 602 initiates a search. When vehicle 202 is embodied as an aerial drone, step 602 may cause vehicle 202 to fly in a spiral, step-wise linear search (i.e., "mowing the lawn"), target one or more identified structures, or other pattern. When vehicle 202 is embodied as human with a connected device, step 202 may be embodied as the human looking for another human to inquire as to the location, proceed to a location reasonably likely to comprise the identifier, or other action. Processing then continues to step 604. Step 604 determines if the identifier has been found and, if so, processing continues as indicated by off-page connector 520. If not, processing continues to step 606.

Step 606 attempts to "ping" a component within customer area 212. For example, vehicle 202 may transmit a signal of an access point in an attempt to get a device to broadcast a packet of data including the identifier. Step 608 inquires again as to whether the identifier was found and, if so, processing continues as indicated by off-page connector 520. If not, processing continues to step 610. Step 610 determines if a timeout condition has occurred and, if not, processing continues to step 602. If true, processing continues to step 612.

Step 612 may signal vehicle 202 to make the delivery of the item in accord with the first location. In another embodiment, step 612 may cause vehicle 202 to return to the dispatch center or other area, such as to remove the item and be readied to deliver another item to another customer. In another embodiment, step 612 may wait (e.g., park, land, sit, etc.) and re-initiate second process portion 600. In yet another embodiment, vehicle 202 may signal resource 112 of the failure and cause resource 112 to initiate communication with customer communication device 108 and customer 120. In still another embodiment, vehicle 202 may attempt to directly locate customer communication device 108 and customer 120. For example, vehicle 202 may have an automated and/or human operated cellular telephone and place a call, send an email, send a text, or otherwise attempt to communicate with customer 120 to identify the proper delivery location.

FIG. 7 depicts third process portion 700 and continues from off-page connector 520 in accordance with embodiments of the present disclosure and is generally associated successfully locating the identifier. From off-page connector 520, processing continues to step 702. Step 702 determines if customer 120 provided a delivery location. For example, a delivery location may include, without limitation, "use dock 6," "place the item on the back porch," etc. step 702 may indicate an area to avoid, "no deliveries to the warehouse during repaving," "do not deliver to the back yard due to a dog," etc. Accordingly, step 704 modifies the first delivery location to a second delivery location. In one embodiment, processing continues directly to step 710. In another embodiment, vehicle sensors 706 are utilized to further determine suitability of a delivery location. For example, vehicle 202 may incorporate a camera and determine one location is suitable (e.g., flat, accessible, etc.) and another area is not (e.g., trees, fence, etc.). Sensor 706 may be an image analysis associated with an accessed satellite or other imagery that may determine a delivery location. When vehicle 202 is sufficiently quiet, step 706 may be an audio sensor and listen for speech, such as, "over here." Accordingly, step 708 may further modify a previous delivery location (e.g., the first and/or second delivery location) to be a third delivery location. Step 710 may then execute the delivery and, optionally, step 712 may report the delivery.

Step 712 may provide additional delivery information. In one embodiment, vehicle 202 may have the ability to provide additional delivery information to resource 112 and/or customer 210 via communications network 104. For example, upon vehicle 202 reaching signal area 212 and/or performing delivery 212, customer 210 may be notified via customer communication device 108 that vehicle 202 is ready to make the delivery. Status updates, videos, position information, sensor data, and/or other information may be made available back to resource 112. For example, "The delivery of your new phone has been made. The package was delivered at 10:31 AM (3 minutes ago). The position of this package is 10 feet south of the building. <Click here for an aerial photo of the package and where it was delivered.>". In another embodiment, a customer may be sent an image, video (live feed or recorded), GPS coordinates, or other information associated with a delivery of the package. In one further embodiment, delivery verification comprising an image or other information is maintained on a website accessible by a link sent to the user and/or associated with a tracking, order, and/or customer number. The information may be kept indefinitely, expire after a predetermined amount of time or be deleted in response to the customer's decision to delete the delivery verification. The delivery verification, if a series of images or a video, may show the package as the delivery vehicle departs, or additional frames such as the delivery vehicle just before or during the delivery. Such information may be helpful to demonstrate that the delivery of an item was not excessively rough.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or broadcasted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A delivery device, comprising:
   a first communication interface that receives at least a first location for an item for delivery and a broadcast identifier associated with a customer communication device placing an order for the item for delivery;
   a broadcasted identifier detection module that receives a broadcasted signal and determines if the broadcasted signal comprises the broadcasted identifier and a source of the broadcasted identifier; and upon determining that the broadcasted identifier has been received by the broadcasted identifier detection module, refines the first delivery location to be a second delivery location in accordance with the source of the broadcasted identifier.

2. The delivery device of claim 1, wherein:
   the first communication interface further receives at least a location of the item for delivery; and
   wherein the delivery vehicle proceeds to the location of the item for delivery for loading thereof prior to directing the delivery vehicle to the first location.

3. The delivery device of claim 1, wherein the first delivery location comprises a postal address for a property comprising the first delivery location.

4. The delivery device of claim 1, wherein:
   the first communication interface further receives a preferred delivery location indicating an offset from the source of the broadcasted identifier; and
   wherein the first delivery location is modified to be the second delivery location in accord with the offset.

5. The delivery device of claim 1, further comprising:
a sensor that receives an indicator of a preferred delivery location; and
upon the sensor receiving the preferred delivery location, further modifying the second delivery location to a third delivery location, wherein the third delivery location is selected in accord with the preferred delivery location.

6. The delivery device of claim 5, wherein the preferred delivery location further comprises at least one location to avoid and causes the delivery device to avoid the at least one location to avoid.

7. The delivery device of claim 1, further comprising a second communication device, wherein the second communication device broadcasts a signal to solicit the transmission of the broadcasted identifier.

8. The delivery device of claim 1, further comprising a second communication device, wherein the second communication device broadcasts a signal to solicit the transmission of a response signal from the customer communication device and wherein the response signal is different from the broadcasted identifier.

9. The delivery device of claim 1, wherein upon reaching the first location and failing to receive the broadcasted identifier, further moves in predetermined pattern within an area associated with the first location to attempt to receive the broadcasted identifier.

10. The delivery device of claim 1, further comprising a camera that captures at least one image of the delivery of the item for viewing of the at least one image by the customer communication device.

11. The delivery device of claim 1, further comprising a navigation component that directs the delivery device, with the item for delivery, to the first location for delivery of the item therein and wherein the navigation component performs the refining of the first delivery location to be a second delivery location in accord with the source of the broadcasted identifier.

12. A delivery device, comprising:
a first communication interface that receives at least a first location comprising a postal address for an item for delivery and a broadcast identifier associated with a customer communication device comprising at least one of a media access control (MAC) or a service set identifier (SSID) placing an order for the item for delivery;
a broadcasted identifier detection module that receives a broadcasted signal and determines if the broadcasted signal comprises the broadcasted identifier and a source of the broadcasted identifier; and upon determining that the broadcasted identifier has been received by the broadcasted identifier detection module, refines the first delivery location to be a second delivery location in accordance with the source of the broadcasted identifier.

13. The delivery device of claim 12, wherein:
the first communication interface further receives at least a location of the item for delivery; and
wherein the delivery vehicle proceeds to the location of the item for delivery for loading thereof prior to directing the delivery vehicle to the first location.

14. The delivery device of claim 12, wherein the first delivery location comprises a postal address for a property comprising the first delivery location.

15. The delivery device of claim 12, wherein:
the first communication interface further receives a preferred delivery location indicating an offset from the source of the broadcasted identifier; and
wherein the first delivery location is modified to be the second delivery location in accord with the offset.

16. The delivery device of claim 12, further comprising:
a sensor that receives an indicator of a preferred delivery location; and
upon the sensor receiving the preferred delivery location, further modifying the second delivery location to a third delivery location, wherein the third delivery location is selected in accord with the preferred delivery location.

17. The delivery device of claim 16, wherein the preferred delivery location further comprises at least one location to avoid and causes the delivery device to avoid the at least one location to avoid.

18. The delivery device of claim 12, further comprising a second communication device, wherein the second communication device broadcasts a signal to solicit the transmission of the broadcasted identifier.

19. The delivery device of claim 12, further comprising a second communication device, wherein the second communication device broadcasts a signal to solicit the transmission of a response signal from the customer communication device and wherein the response signal is different from the broadcasted identifier.

20. A method for operating a delivery vehicle, comprising:
receiving, by a processor, at least a first location for an item for delivery and a broadcast identifier associated with a customer communication device placing an order for the item for delivery;
identifying, by the processor, a broadcasted signal and determining if the broadcasted signal comprises the broadcasted identifier and a source of the broadcasted identifier; and
upon the processor determining that the broadcasted identifier has been received by the broadcasted identifier detection module, refining, by the processor, the first delivery location to be a second delivery location in accordance with the source of the broadcasted identifier.

* * * * *